(12) United States Patent
Pulikonda

(10) Patent No.: US 9,058,372 B2
(45) Date of Patent: Jun. 16, 2015

(54) DATABASE MANAGEMENT IN A WIRELESS COMMUNICATION SYSTEM

(75) Inventor: Sridhar V. Pulikonda, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 811 days.

(21) Appl. No.: 11/466,736

(22) Filed: Aug. 23, 2006

(65) Prior Publication Data
US 2008/0049691 A1     Feb. 28, 2008

(51) Int. Cl.
  H04W 4/00      (2009.01)
  G06F 17/30     (2006.01)
  H04L 12/58     (2006.01)
  H04W 4/12      (2009.01)
  H04W 4/14      (2009.01)

(52) U.S. Cl.
  CPC ....... *G06F 17/30578* (2013.01); *H04L 12/5895* (2013.01); *H04W 4/12* (2013.01); *H04W 4/14* (2013.01)

(58) Field of Classification Search
  CPC ....... H04L 12/5895; H04W 4/12; H04W 4/14
  USPC .................. 707/201, 203; 370/338, 351, 401; 455/430, 426.1, 455, 435.1, 466; 340/990, 10.1, 5.8; 379/211.01
  See application file for complete search history.

(56) References Cited

U.S. PATENT DOCUMENTS 5,285,494 A * 2/1994 Sprecher et al. .............. 455/423
5,511,232 A * 4/1996 O'Dea et al. .................. 455/519
6,034,621 A * 3/2000 Kaufman ...................... 340/7.21
6,931,454 B2 * 8/2005 Deshpande et al. .......... 709/248
7,523,110 B2 * 4/2009 Holenstein et al. ............... 707/8
2002/0042886 A1 * 4/2002 Lahti et al. ..................... 713/201
2002/0129107 A1   9/2002 Loughran et al.
2004/0078374 A1   4/2004 Hamilton
2006/0047713 A1 * 3/2006 Gornshtein et al. .......... 707/202

FOREIGN PATENT DOCUMENTS

| CN | 1472911 A | 2/2004 |
|---|---|---|
| EP | 1 184 772 | 3/2002 |
| WO | WO 02/19067 | 3/2002 |

* cited by examiner

*Primary Examiner* — Mahendra Patel

(57) ABSTRACT

An apparatus, system, and method provide database management within a wireless communication system by maintaining a database within wireless communication devices transmitting changes using wireless messages. An initiating slave wireless communication device, maintaining a first data version of a database, transmits a database modification request message to a master wireless communication device maintaining a second data version of the database. After modifying the second data version of the database in accordance with the database modification request message, the master wireless communication device transmits a database modification instruction to any number of non-initiating slave wireless communication devices to modify other data versions of the database maintained at the respective non-initiating slave wireless device. As a result, the multiple data versions are synchronized to maintain a database within the wireless communication system.

8 Claims, 5 Drawing Sheets

US 9,058,372 B2

DATABASE MANAGEMENT IN A WIRELESS COMMUNICATION SYSTEM

TECHNICAL FIELD

The invention relates in general to wireless communication devices and more specifically to an apparatus, system, and method for managing databases in a wireless communication system.

BACKGROUND

Databases allow groups of users to maintain a single set of data that can be modified and accessed by the users. Conventional database solutions for wireless devices include establishing a database on a server and providing access to the users through the World Wide Web (WWW). A Web browser application running on each wireless device is used to access a web page that provides the access to the database. Conventional database techniques are limited in several ways. For example, each user must have a data services subscription with the wireless service in order to access the WWW and the database. The data services subscriptions typically result in additional user charges to the standard wireless service. Manufacturers of wireless equipment and applications providers may require support from the wireless communication services provider. Further, the user must often need to know how to operate a web browser and how to access data services.

Accordingly, there is a need for database management in a wireless communication system.

SUMMARY

An apparatus, system, and method provide database management within a wireless communication system by maintaining a database within wireless communication devices transmitting changes using wireless messages. An initiating slave wireless communication device, maintaining a first data version of a database, transmits a database modification request message to a master wireless communication device maintaining a second data version of the database. After modifying the second data version of the database in accordance with the database modification request message, the master wireless communication device transmits a database modification instruction to any number of non-initiating slave wireless communication devices to modify other data versions of the database maintained at the respective non-initiating slave wireless device. As a result, the multiple data versions are synchronized to maintain a database within the wireless communication system.

DETAILED DESCRIPTION

Figure 1:
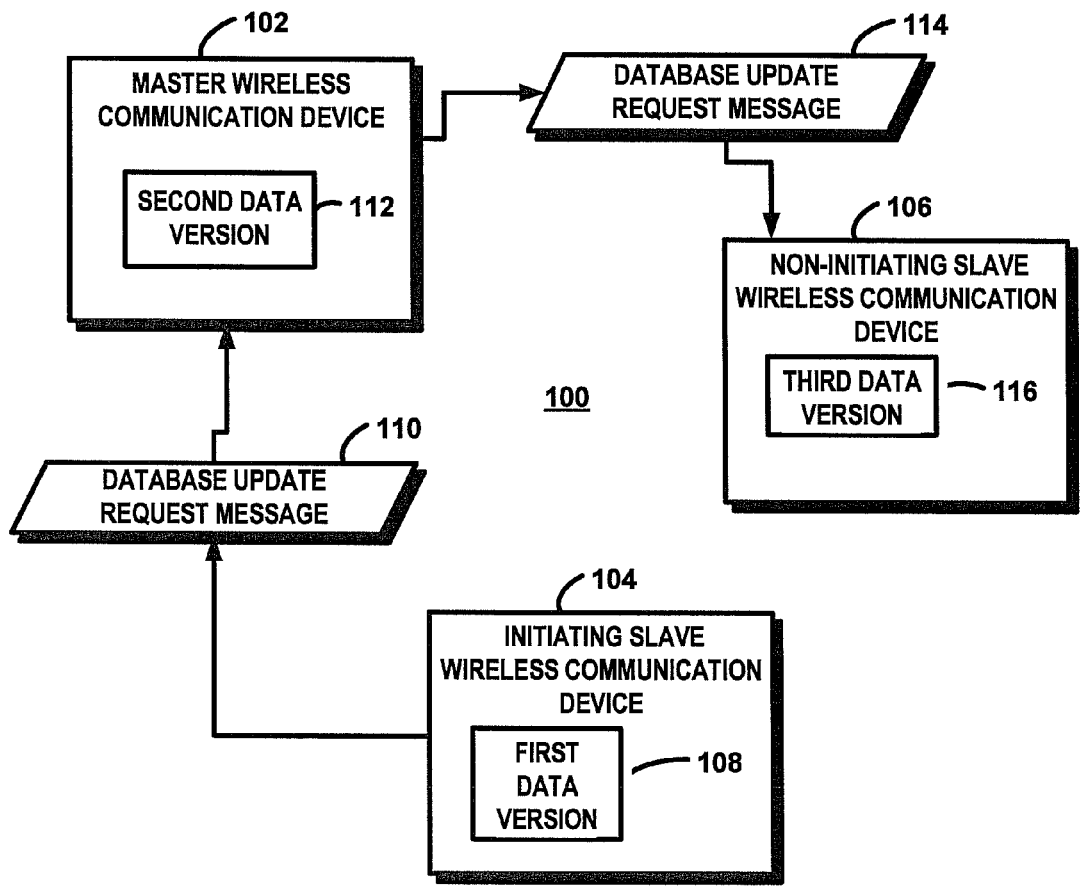
FIG. 1 is a block diagram of wireless communication system in accordance with an exemplary embodiment of the invention.

FIG. 1 is a block diagram of a wireless database system 100 in accordance with the exemplary embodiment of the invention. The wireless database system 100 can be implemented in any of several wireless communications system utilizing any of numerous protocols, frequencies and modulation techniques. In the exemplary embodiment, the wireless communication system is a cellular communication system where base stations (not shown) provide wireless services to wireless communication devices. In addition to voice service, the wireless communication system provides at least one message service such as, for example, Short Message Services (SMS), Instant Messaging (IM), Enhanced Messaging Services (EMS), or Multimedia Messaging Services (MMS).

The database system 100 includes at least a master wireless communication device 102 and at least one slave wireless communication device 104, 106. In many configurations, the database system 100 includes multiple slave wireless communication devices (slave devices) 104, 106 where a slave device may participate as an initiating slave wireless communication device (initiating slave device) 104 or a non-initiating slave wireless communication device (non-initiating device) 106 at any given time. Before a database is established, each of the devices 102, 104, 106 is configured to be a master wireless communication device 102 or a slave device 104, 106. In the exemplary embodiment, a group list is established to maintain a list of devices that are members of the database group.

Each of the devices 102, 104, 106 maintains a data version 108, 112, 116 of the database in memory (not shown in FIG. 1). When the database in synchronized, the data versions 108, 112, 116 contain the same data. When a user changes information in the data version of the user's device the change is propagated through the database system 100 to all members with the group to implement the change to the database. After a user of the initiating device 104 enters a change to the database by modifying the first data version 108, the initiating device 104 generates and transmits a database modification request message 110 to the master device 102. The master device 102 applies the requested modification to the second data version 112 and sends a database modification instruction message 114 to all other slave devices 106. In the exemplary embodiment, the master device 102 sends an acknowledgement message (not shown in FIG. 1) to the initiating device 104 indicating that the database has been changed and confirming that the first data version 108 should reflect the change. In response to receiving the database modification instruction, the non-initiating device 106 applies the change to the third data version 116. Collision avoidance procedures are invoked in the exemplary embodiment to manage multiple database modification request messages transmitted by more than one initiating device 104. In situations where the master device 102 is also the initiating device 104, the master device 102 transmits the database modification instruction message 114 to all slave devices 104, 106.

The database modification request message 110 and the database modification instruction message 114 are transmitted through the wireless communication system using a messaging service such as SMS, IM, EMS, MMS, or email. Accordingly, the wireless communication devices 102, 104, 106 generate the database modification request messages 110, database modification instruction messages 114, and acknowledgment messages in accordance with the format of the particular message service.

Figure 2:
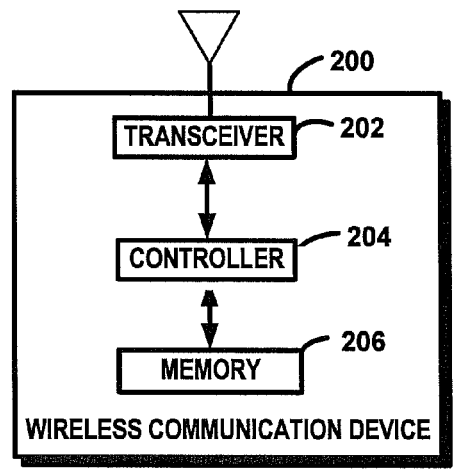
FIG. 2 is a block diagram of a wireless communication device in accordance with the exemplary embodiment.

FIG. 2 is a block diagram of an exemplary wireless communication device 200 suitable for operation within the database system 100. The wireless communication device 200 may be a cellular telephone, wireless modem, personal digital assistant (PDA) or other device that exchanges electromagnetic signals with a fixed or portable communication device. In the exemplary embodiment, the wireless communication device 200 includes other hardware, software, and firmware not shown in FIG. 2 for facilitating and performing the functions of a wireless communication device 200. For example, the wireless communication device 200 includes input and output devices such as keypads, displays, microphones and speakers. Further, the functions and operations of the blocks described in FIG. 2 may be implemented in any number of devices, circuits, or elements. Two or more of the functional blocks may be integrated in a single device and the functions described as performed in any single device may be implemented over several devices. For example, at least portions of the transceiver 202 and the controller 204 may be implemented within a single integrated circuit such as an application specific integrated circuit (ASIC).

In the exemplary embodiment, the wireless communication device 200 can be configured to be a master device 102 or a slave device 104, 106 for a particular database. In some circumstances, the wireless communication device 200 may be configured to be a master device 102 for a first database and as a slave device 104, 106 for a second database. Further, the wireless communication device 200 may be configured as a master device 102 for multiple databases and as a slave device 104, 106 for numerous other databases.

During operation, the transceiver 202 exchanges electromagnetic signals through a wireless channel with a base station. The controller 204 includes a processor, microprocessor, computer or other logic hardware and software configured to perform the database functions described herein as well as to facilitate the overall functionality of the wireless communication device 200. In the exemplary embodiment, the controller 204 includes executable code running on a microprocessor. The memory 106 is any type of memory device configured store data and allow the controller to read and write information to and from the memory 206.

When the wireless communication device is configured as a master device 102, the controller 204 deciphers database modification request messages 110, modifies the data version 112 in memory 206 and sends the appropriate database modification instruction messages 114 and acknowledgement messages to the slave devices 104, 106. After the transceiver 202 receives and demodulates a database modification request message 110 from an initiating slave device 104, the controller 204 deciphers the message 110 and extracts the requested data change to the database in accordance with the protocol of the particular message service. The database modification request message 110 may include instructions and new information to be added to the database, instructions to delete identified data, and/or instructions and information to modify to existing information in the database. The controller 206 accesses the memory 206 and applies the requested change to the data version 112 of the database stored in the memory 206. When the modification is complete, the controller generates an acknowledgment message that is transmitted to the initiating slave device 104.

Any of numerous collision avoidance procedures can be invoked to manage multiple, simultaneous, or nearly simultaneous, database modification request messages 110 sent from multiple slave devices 104. An example of a suitable technique includes resending database modification request messages 110 until an acknowledgement message is received and only modifying the data version at the initiating slave device 104 if an acknowledgement is received. If an initiating slave device 104 does not receive an acknowledgment message within a maximum time period, the request message is resent. In some circumstances, the initiating slave device 104 may wait a random time before sending another request message. Also, priority levels can be assigned to the slave wireless communication devices 104, 106 and the maximum random wait time may be limited based on priority level. In another suitable example of a collision avoidance procedure, the master device 102 generates and transmits either a positive acknowledgement indicating the requested change has been applied or a negative acknowledgment indicating requested change has not been applied.

Figure 3:
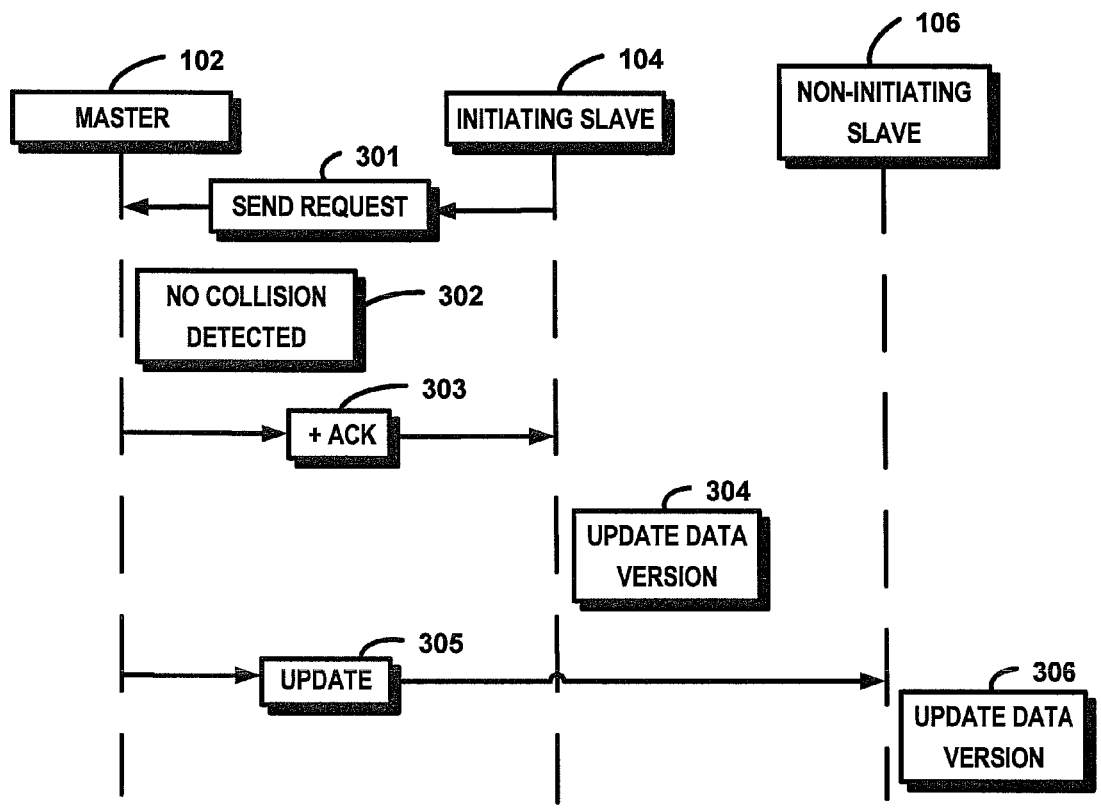
FIG. 3 is a message flow diagram between a master wireless communication device and a slave wireless communication devices.

FIG. 3 is message flow diagram of an exemplary message exchange between the master device 102 and the slave devices 104, 106. The sequence of the following example may be modified in some circumstances and the order of the events may be changed. Further, two or more events may occur simultaneously in some configurations.

At time 301, the initiating slave device 104 transmits a database modification request message 110 to the master device 102 using a message service such as SMS. At time 302, the master device 102 determines that no collision has occurred. At time 303, the master device applies that requested change to the data version stored in the memory of the master device 102. At time 304, the master device 102 generates and transmits a positive acknowledgment message to the initiating slave device 104. At time 305, the initiating slave device 104 applies the requested change to the data version 108 stored in the memory of the initiating slave device 104. At step 305, the master device 102 generates and transmits a database modification instruction message 114 to all other slave devices (non-initiating slave devices) 106 in the database group. At time 306, the non-initiating slave devices 106 apply the database change to the data versions 116 stored in memories of the non-initiating slave devices 106.

Figure 4:
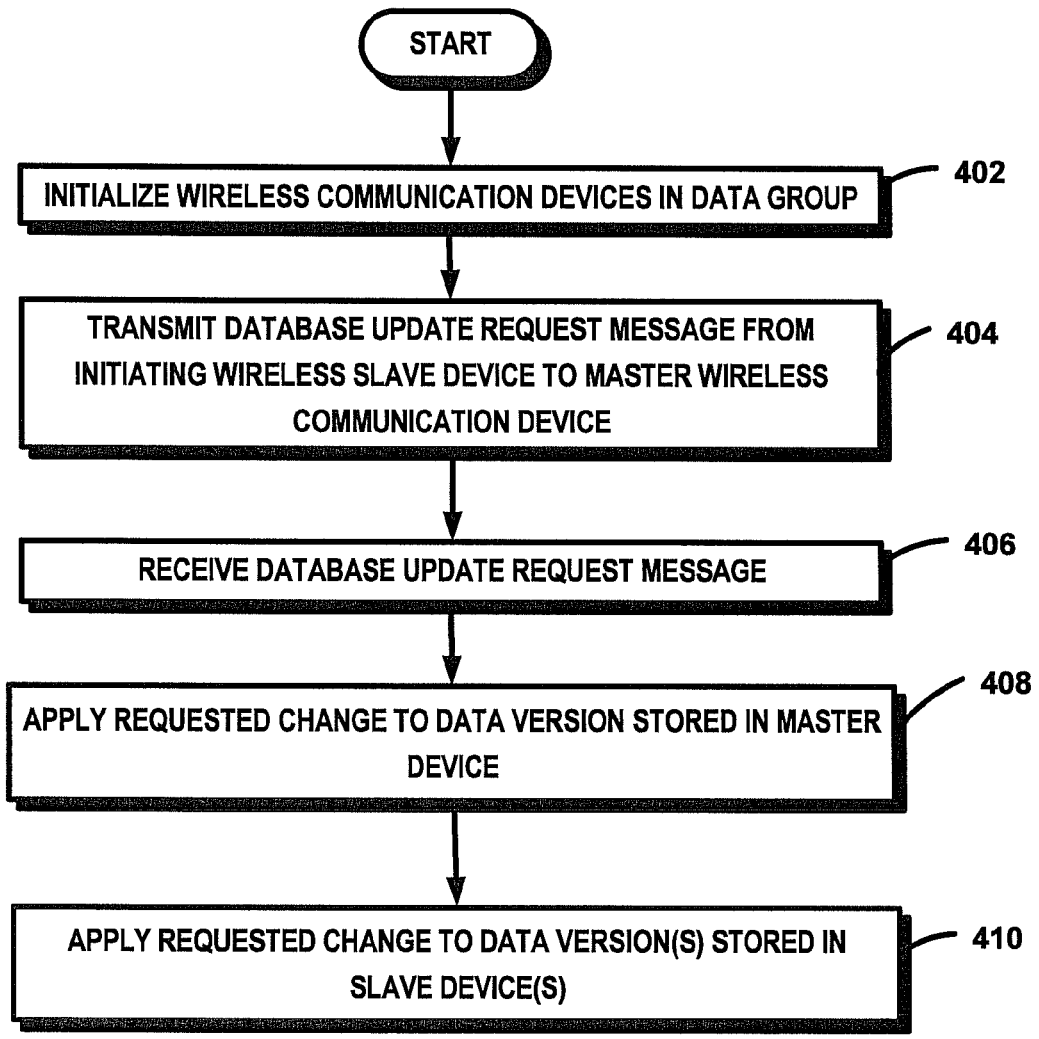
FIG. 4 is a flow chart of a method of managing a database in a wireless communication system.

FIG. 4 is a flow chart of a method of managing a database in a wireless communication system. In the exemplary embodiment, the method is performed within a cellular communication system supporting at least one type of message service such as SMS, IM, EMS, MMS, or email. The steps described in reference to FIG. 4 are performed by wireless communication devices. An example of a method executed in a slave wireless device 104, 106 is discussed below with reference to FIG. 5 and an example of a method executed in the master wireless device 102 is discussed below with reference to FIG. 6.

At step 402, the wireless communication devices 102, 104, 106 are initialized for a database. Each wireless communication device 102, 104, 106 is identified as belonging to the database group. One wireless communication device (102) within the database group is configured as the master wireless communication device 102 for the database group. The other devices (104, 106) within the group are configured as slave wireless communication devices 104, 106. In the exemplary embodiment, each wireless communication device 102, 104, 106 includes code to operate as a master and as a slave. The configuration for a particular database is identified with an indicator that is associated with an identification of the database. The configuration may be established by the user or automatically using an ad hoc procedure for establishing a master device 102 for the database group. A particular wireless device may be configured to operate within multiple database groups and may be configured to operate as a master device 102 for one or more database groups and as a slave device 104, 106 for other database groups. Additional wireless devices may be added to a database group as slave devices 104, 106 in some circumstances. After configuration of each wireless device 102, 104, 106, a database group is established having a master device 102 and at least one slave device 104 where each device retains in memory 206 information allowing the wireless devices 102, 104, 106 to transmit messages to the appropriate wireless device in the database group. The master device 102 includes messaging addresses for each of the slave devices 104, 106 and the slave devices 1004, 106 include the messaging address of the master device 102. In the exemplary embodiment, a new database is established by first configuring a master device 102 and establishing a database group list in the master device 102. Slave devices are initialized and added to the database group list. Each device maintains a database group list. Changes to the database group list are transmitted by the master device to the slave devices. When a slave device is added to the database group, the master device transmits messages to the other slave devices to update the group list. New slave devices can be added to the group and group list can be managed using any of numerous techniques.

At step 404, an initiating wireless device 104 generates and transmits to the master device 102 a database modification request message 110 using the messaging service of the wireless communication system. In the exemplary embodiment, the message 110 is generated and transmitted in accordance with SMS protocols although other message services can be used.

At step 406, the master device 102 receives the database modification request message 110. The requested change to the database is extracted from the message 110. In accordance with SMS message reception techniques, the master device 102 reads the information contained in the payload of the message 110.

At step 408, the requested change is applied to the data version 112 of the database stored in the memory 206 of the master device 102. The master device replaces, adds or deletes the data in the data version 112.

At step 410, the requested change is applied to the slave devices 104, 106. An acknowledgement message is sent to the initiating slave device and database modification instruction messages 114 are transmitted to the non-initiating slave devices 106. In response to receiving the acknowledgment message, the initiating slave device 104 modifies the data version 108 of the database stored in memory 206 of the slave device 104. The non-initiating slave devices 106 apply the requested change by modifying the data versions 116 of the database stored in their respective memories 206.

Figure 5:
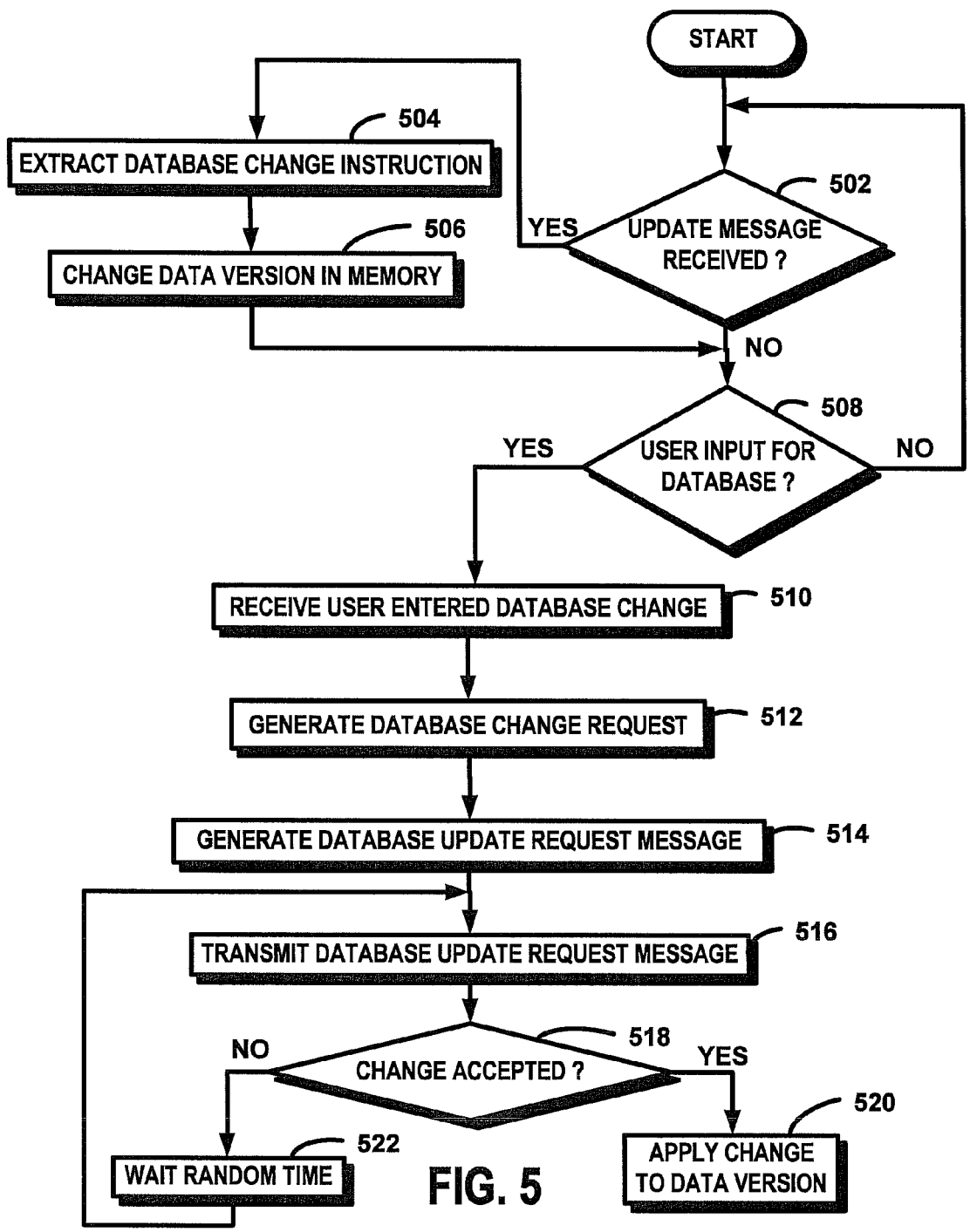
FIG. 5 is a flow chart of a method of managing a database in a wireless communication system performed in a slave wireless communication device.

FIG. 5 is a flow chart of a method of managing a database in a wireless communication system performed in a slave device 104, 106. The method described with reference to FIG. 5 may be performed by any combination of hardware, software and/or firmware. In the exemplary embodiment, software code is executed in the controller 204 to perform the calculation, generating and other processing functions as well as generating the appropriate control signals for directing the operation of other components and receiving information from other components in the wireless communication device 200.

At step 502, the slave device 104, 106 determines whether a database modification instruction message 114 has been received from the master device 102. If no message 114 has been received, the method proceeds to step 508. Otherwise, the method continues at step 504. Any of numerous techniques can be used to identify an incoming database modification instruction message 114. For example, an identifier may be included in a defined field within the payload that indicates the message service message contains database information.

At step 504, the database change instruction is extracted from the database modification instruction message 114. In accordance with the particular message service protocol, the controller 204 retrieves the payload of the message service message. In the exemplary embodiment, the payload includes defined fields that least identify the database and provide the modification information.

At step 506, the data version 116 of the database stored at the slave device 104, 106 is modified in accordance with the database change instruction. Accordingly, entries in the database are added, deleted, or modified in accordance with the received instructions.

At step 508, the slave device 104, 106 determines whether user inputs have been entered relating to the database. If database information has been entered, the method proceeds to step 510. Otherwise, the method returns to step 502 to continue monitoring for messages and user inputs related to the database. Any of several techniques may be used to identify database user inputs. In the exemplary embodiment, a database screen is displayed to the user and keypad entries and other user initiated commands entered to the database are interpreted as requested changes to the database.

At step 510, the database requested change is received through a user input of the wireless communication device. Information related to the database and entered through a user input device such as a keypad, keyboard, touchpad, button, touch screen, or microphone is temporarily stored in the memory 206 as a requested database change. The information may be an addition, deletion or modification of existing data in the database. As explained below, the requested change is not applied to the data version until a positive acknowledgement is received.

At step 512, the controller 204 in the slave device 104, 106 generates a database modification request based on the information. In some circumstances, the controller 204 compares the user entered information to the data version of the database to generate a one or more data changes that include indicators to add, delete, or replace information as well as.

At step 514, the controller generates a database modification request message. The controller formats and inserts the database change request into message service message such as a SMS, IM, EMS, MMS, or email message.

At step 516, the transceiver 202, at the direction of the controller 204, transmits the database modification request message 110 through the cellular communication network. Using the address stored in memory 206 and associated with the master device 102, the message service message is addressed to the master device 102. The message 110 is transmitted in accordance with the particular protocol of the cellular communication system and message service.

At step 518, it is determined whether the database modification request has been accepted by the master device 102. In the exemplary embodiment, if the initiating slave device 104 receives a positive acknowledgment message, it is determined that the database modification request has been accepted by the master device 102 and the method continues at step 520. It is determined that the database modification request has not been accepted by the master device 102 when the initiating slave device receives a negative acknowledgment message or if no acknowledgment message is received within a maximum timeout period. Other combinations and techniques for determining whether the database modification request has been accepted. For example, the negative acknowledgement message may be omitted in some systems where the slave devices utilize a timeout procedure. If the database modification request has not been accepted, the method continues at step 522.

At step 520, the initiating slave device 104 applies the database change to the data version of the database stored in the initiating slave device. The temporarily stored changes entered by the user are applied to the data version 108 in the initiating slave device 104.

At step 522, the initiating slave device 104 waits a random time period between zero and a maximum wait time and returns to step 516. The random wait time reduces the likelihood that another initiating slave device 104 that caused a collision will transmit at the same time and cause another collision.

Figure 6:
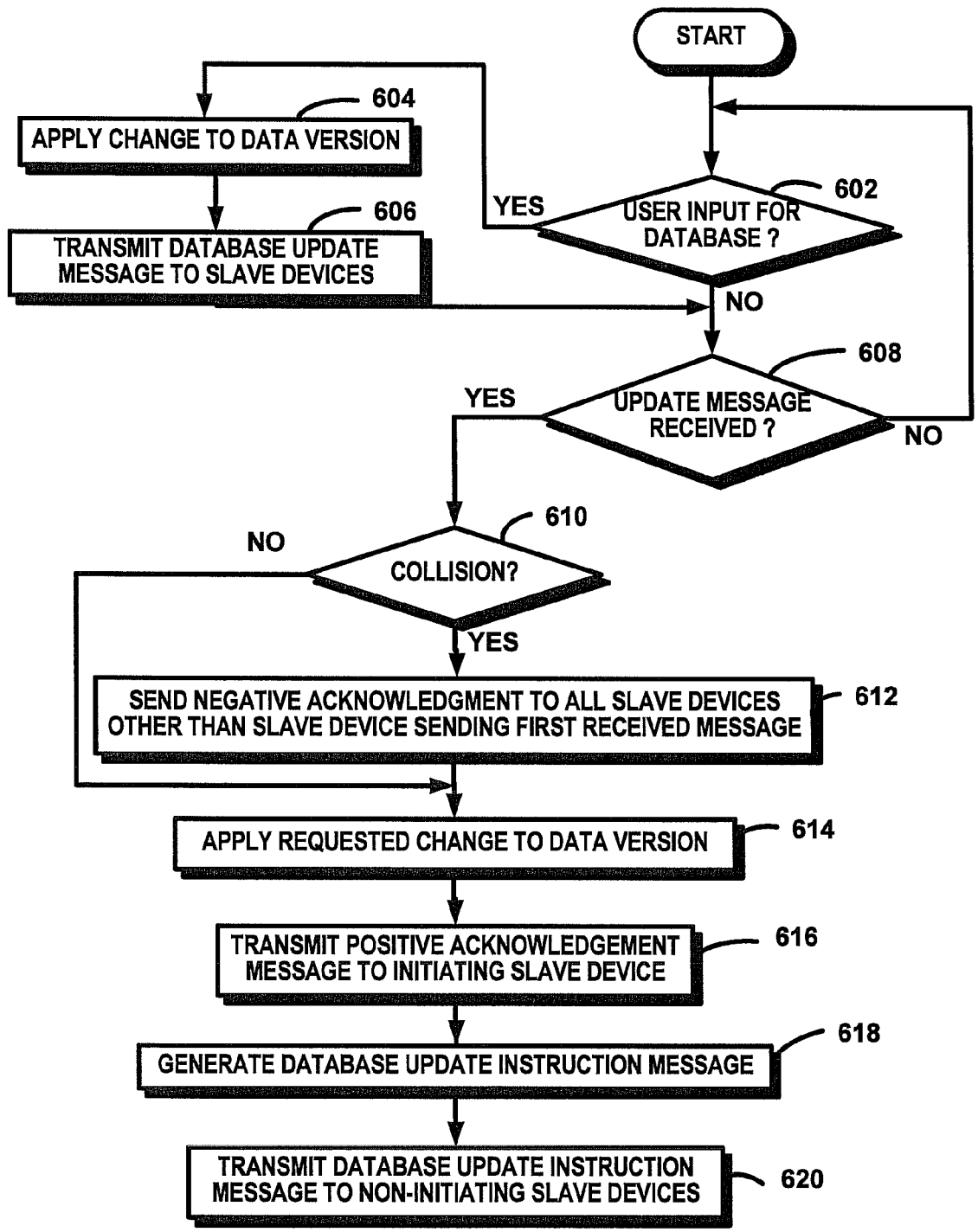
FIG. 6 is a flow chart of a method of managing a database in a wireless communication system performed in a master wireless communication device.

FIG. 6 is a flow chart of a method of managing a database within a wireless communication system performed in the master wireless communication device. The method described with reference to FIG. 6 may be performed by any combination of hardware, software and/or firmware. In the exemplary embodiment, software code is executed in the controller 204 to perform the calculation, generating and other processing functions as well as generating the appropriate control signals for directing the operation of other components and receiving information from other components in the wireless communication device 200.

At step 602, the master device 102 determines if the user has entered data related to the database. If database related user inputs have not been entered, the method continues at proceeds to step 608. Otherwise, the method continues at step 604.

At step 604, the data entered by the user is applied to the data version 112 of the database stored at the master device 102. The appropriate data is deleted, added of modified in accordance with the change entered by the user through an input device.

At step 606, a database modification instruction message 114 is generated and transmitted to the slave devices 106. Since the initiating device is the master device in this circumstance, the database modification instruction message 114 is transmitted to all other slave devices in the group.

At step 608, the master device 102 determines whether a database modification request message 110 has been received. Any of numerous techniques can be used to identify an incoming database modification instruction message 110. For example, an identifier may be included in a defined field within the payload that indicates the message service message contains database information. If a database modification request message 110 has been received, the method continues at step 610. Otherwise the method returns to step 602 to continue monitoring for user input data and received messages related to the database.

At step 610, the master device 102 determines if a message collision has occurred. In the exemplary embodiment, the controller 204 determines if at least one additional database modification request message 110 has been received from a second initiating slave device (104) before the requested change for a message received from a first initiating slave device 104 has been applied to the database. If a collision has occurred, the method continues to step 612 where a negative acknowledgement message is transmitted to all of the initiating slave devices other than the initiating slave device transmitting the first received modification request message. If the collision has occurred, the method skips to step 614.

At step 614, the master device 102 applies the requested change to the data version of the database stored in memory of the master device. The controller 204 deletes, adds, or modifies the data version 112 in accordance with the requested database change.

At step 616, the master device 102 generates and transmits a positive acknowledgment message to the initiating slave device.

At step 618, the master device 102 generates a database modification instruction message 114. In the exemplary embodiment, the message 114 includes the necessary information and commands to change the data versions 116 in the non-initiating slave devices 106 in accordance with the requested change sent by the initiating slave device 104. Addressing information is applied to the message in accordance with the protocol of the communication system.

At step 620 the master device 102 transmits the database modification message to all slave devices 106 other than the initiating slave device 104. Using the addressing information stored in memory 206, the controller 204 formats the SMS message which is transmitted by the transceiver 202.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of managing a plurality of databases in a wireless communication system having a plurality of wireless communication devices, the method comprising:

establishing a first database group comprising at least a subset of the plurality of wireless communication devices to manage a first database of the plurality of databases, wherein each wireless communication device of the first database group is configurable to be a master device or a slave device;

configuring a first device of the first database group to be a master wireless communication device, and the other devices of the first database group to be a plurality of slave wireless communication devices;

assigning a priority level to each slave wireless communication device;

receiving, at the master wireless communication device through a wireless communication channel, a database modification request message generated by an initiating slave wireless communication device of the plurality of slave wireless communication devices maintaining a first data version of the first database, wherein the database modification request message has a format in accordance with a format selected from the group consisting of a Short Message Services (SMS) format, an Instant Messaging (IM) format, an Enhanced Messaging Services (EMS) format, and a Multimedia Messaging Services (MMS) format; and retransmitting the database modification request message by the initiating slave wireless communication device if an acknowledgement message is not received from the master wireless communication device within a maximum time period in accordance with a collision avoidance procedure, wherein the maximum time period is based upon the priority level assigned to the initiating slave wireless communication device.

2. The method of claim 1, further comprising:
transmitting a database modification instruction message to the plurality of non-initiating slave wireless communication devices.

3. The method of claim 1, wherein the collision avoidance procedure comprises:
modifying the second data version in accordance with a first received database modification request message; and
transmitting an acknowledgment message to the initiating slave wireless communication device transmitting the first received database modification request message.

4. A method of database management in a wireless communication system, comprising a master-slave configuration, the method comprising:
maintaining, in an initiating slave wireless communication device, a first data version of a database;
transmitting to a master wireless communication device through a wireless communication channel and a base station, a database modification request message, the database modification request message having a format in accordance with a format selected from the group consisting of a Short Message Services (SMS) format, an Instant Messaging (IM) format, an Enhanced Messaging Services (EMS) format, and a Multimedia Messaging Services (MMS) format, to modify the database in accordance with a requested database change entered by a user at the initiating slave wireless communication device; and
retransmitting the database modification request message from the initiating slave wireless communication device if an acknowledgement message is not received from the master wireless communication device within a maximum time period, wherein the maximum time period is based upon a priority level assigned to the initiating slave wireless communication device.

5. The method of claim 4, further comprising:
receiving an acknowledgement message from the master wireless communication device; and
applying the requested database change to the first data version of the database.

6. A wireless communication device, within in a wireless communication system with a master-slave configuration, comprising:
a memory configured to store a first data version of a database;
a controller configured to generate a database modification request message in accordance with a user input;
a transceiver configured to transmit the database modification request message, through a base station, to a master wireless communication device maintaining a second data version of a database wherein the database modification request message has a format in accordance with a format selected from the group consisting of a Short Message Services (SMS) format, an Instant Messaging (IM) format, an Enhanced Messaging Services (EMS) format, and a Multimedia Messaging Services (MMS) format;
the transceiver is further configured to receive an acknowledgement message from the master wireless communication device; and
the transceiver is further configured in accordance to a collision procedure to retransmit the database modification request message if the acknowledgement message is not received from the master wireless communication device within a maximum time period, wherein the maximum time period is based upon a priority level assigned to the wireless communication device.

7. The wireless communication device of claim 6, wherein the transceiver is further configured to receive, from the master wireless communication device through a base station, a database modification instruction message including a requested database modification submitted by an initiating slave wireless communication device, wherein the database modification instruction message has a format in accordance with a format selected from the group consisting of a Short Message Services (SMS) format, an Instant Messaging (IM) format, an Enhanced Messaging Services (EMS) format, and a Multimedia Messaging Services (MMS) format.

8. The wireless communication device of claim 6, the controller further configured to, in response to a positive acknowledgement message, to apply a user entered database modification corresponding to the database modification request message to the first data version.

* * * * *